United States Patent [19]

Malagrino, Jr. et al.

[11] Patent Number: 5,018,311
[45] Date of Patent: May 28, 1991

[54] MAGNETIC DISK BURNISHING METHOD AND APPARATUS

[75] Inventors: Gerald D. Malagrino, Jr., Rochester; Dale A. Nelson, Oronoco, both of Minn.

[73] Assignee: International Business Machines Corporation, Armonk, N.Y.

[21] Appl. No.: 372,971

[22] Filed: Jun. 28, 1989

[51] Int. Cl.$^5$ .......................... B24B 21/06; B24B 5/00
[52] U.S. Cl. .................................. 51/140; 51/145 R; 51/154
[58] Field of Search ........... 51/150, 154, 155, 281 SF, 51/141, 140, 145 R

[56] References Cited

U.S. PATENT DOCUMENTS

| 996,443 | 6/1911 | Wysong | 51/140 |
|---|---|---|---|
| 3,041,792 | 7/1962 | LaFleur | 51/154 |
| 4,347,689 | 9/1982 | Hammond | 51/281 SF |
| 4,535,567 | 8/1985 | Seaborn | 51/154 X |
| 4,656,790 | 4/1987 | Mukai | 51/141 |

Primary Examiner—Frederick R. Schmidt
Assistant Examiner—Bruce P. Watson
Attorney, Agent, or Firm—Robert W. Lahtinen

[57] ABSTRACT

A tape burnishing device presents aligned stretches of burnishing tape at each side of a rotating disk. Air nozzles at each side of the disk urge an elliptical pattern of the respective stretches of tape into contact with the disk. During burnishing the tape is stationary while the device is advanced to burnish the desired surface of the disk. The tape stretches, that are portions of a single tape, are positioned at an angle with respect to the radius of the disk and the device is advanced in a radial direction to optimize the burnishing action relative to the rotating disk surface. The tape is advanced between burnishing operations twice the dimension of use during a burnishing operation with the two operating locations out of phase to enable the single tape to advance past both burnishing locations while presenting an unused surface at each location and using the entire surface of the tape.

9 Claims, 6 Drawing Sheets

MAGNETIC DISK BURNISHING METHOD AND APPARATUS

FIELD OF THE INVENTION

This invention pertains to burnishing and more particularly to a method and apparatus for burnishing or lapping a magnetic storage disk surface prior to final test.

BACKGROUND OF THE INVENTION

Rigid magnetic disks must possess a final smooth planar surface to avoid interference between the transducer carrying slider and the media surface during operation. As the fly heights of sliders is reduced below 10 microinches in progressively higher density disk drive environments, the reduction or elimination of asperities at the disk surface becomes more critical. Disk substrates are carefully processed and inspected to assure that the surfaces are flat within a few millionths of an inch. A thin film disk, which normally includes a magnetic coating that is less than four millionths of an inch thick, is the most critical environment. The rigid disk substrate, which is most commonly aluminum, but may be of other materials such as glass or silicon, is finished to a smooth planar surface. Following the application of the underlayers, magnetic coating and protective coating, including lubricant, the disk in the final form is burnished or lapped to assure that any remaining or grown asperities are removed prior to glide testing which examines whether the flatness achieves the required functional surface specification.

Prior art devices for providing the burnishing or lapping function on flexible magnetic disks are shown in U.S. Pat. Nos. 4,535,567 and 4,656,790. In U.S. Pat. No. 4,535,567, a pair of abrasive tapes are used to burnish respective opposite sides of a disk with the disk urged by an air knife against each of the abrasive tapes as it passes over a roller. In U.S. Pat. No. 4,656,790, opposed air knives confront opposite sides of the disk with the abrasive tape interposed between the disk and one air knife. In both patents the disk is rotated and the tape is advanced during the burnishing operation.

SUMMARY OF THE INVENTION

The invention provides an improved method and apparatus for using a lapping tape to run across the surfaces of a disk to perform a lap grinding process as the disk is rotated. This removes asperity peaks to assure a smoother surface before glide testing.

The apparatus of the invention uses a single tape to burnish both sides of a disk simultaneously. A nozzle-deflector assembly directs an air stream against the stretch of tape intermediate roller support members to bias an elliptical area of the tape into contact with the rotating disk to perform the burnish or lapping operation. Urging an area of the flexible, abrasive tape against the disk surface provides a more diffused area of less pressure than is afforded by the line contact of an air knife or urging the tape against the disk surface during tape passage over a rigid or resilient roller. The tape is advanced between burnishing operations to present a new tape surface for each operation whereby the tape is used once and discarded. The tape is indexed twice the length that is used during a burnish or lapping operation on the first disk surface and the tape is aligned at the second burnish position to utilize the unused tape surface intermediate the spaced, used tape locations associated with the first burnish operation. The tape is stationary during the burnish operation while the disk rotates to minimize the transfer of binder material of the abrasive tape or the generation of binder material particles during burnishing.

DETAILED DESCRIPTION

Figure 1:
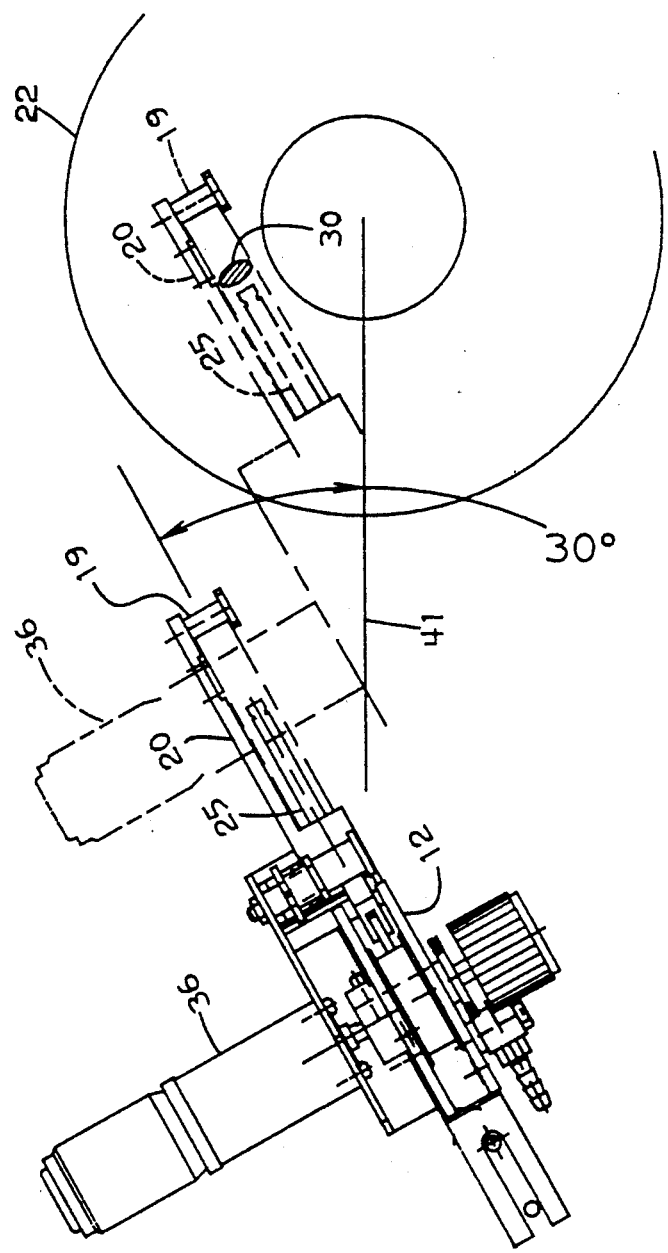
FIG. 1 is a plan view of the burnishing fixture of the present invention in a retracted position with the full position with respect to the disk shown in phantom view.

The apparatus illustrated in the drawing figures burnishes disk asperities or defects from the surfaces of rigid magnetic disks. The process uses abrasive burnishing tape that is forced to the surface of the disk by angular jets of air while a spindle rotates the disk at a high rotational velocity. The angular jets of air cause the air to be diffused on the back of the tape providing an elliptical surface of contact between tape and disk. The tape is held stationary during the burnish process to minimize the transfer of tape binder and other debris from the tape to the disk surface.

Figure 2:
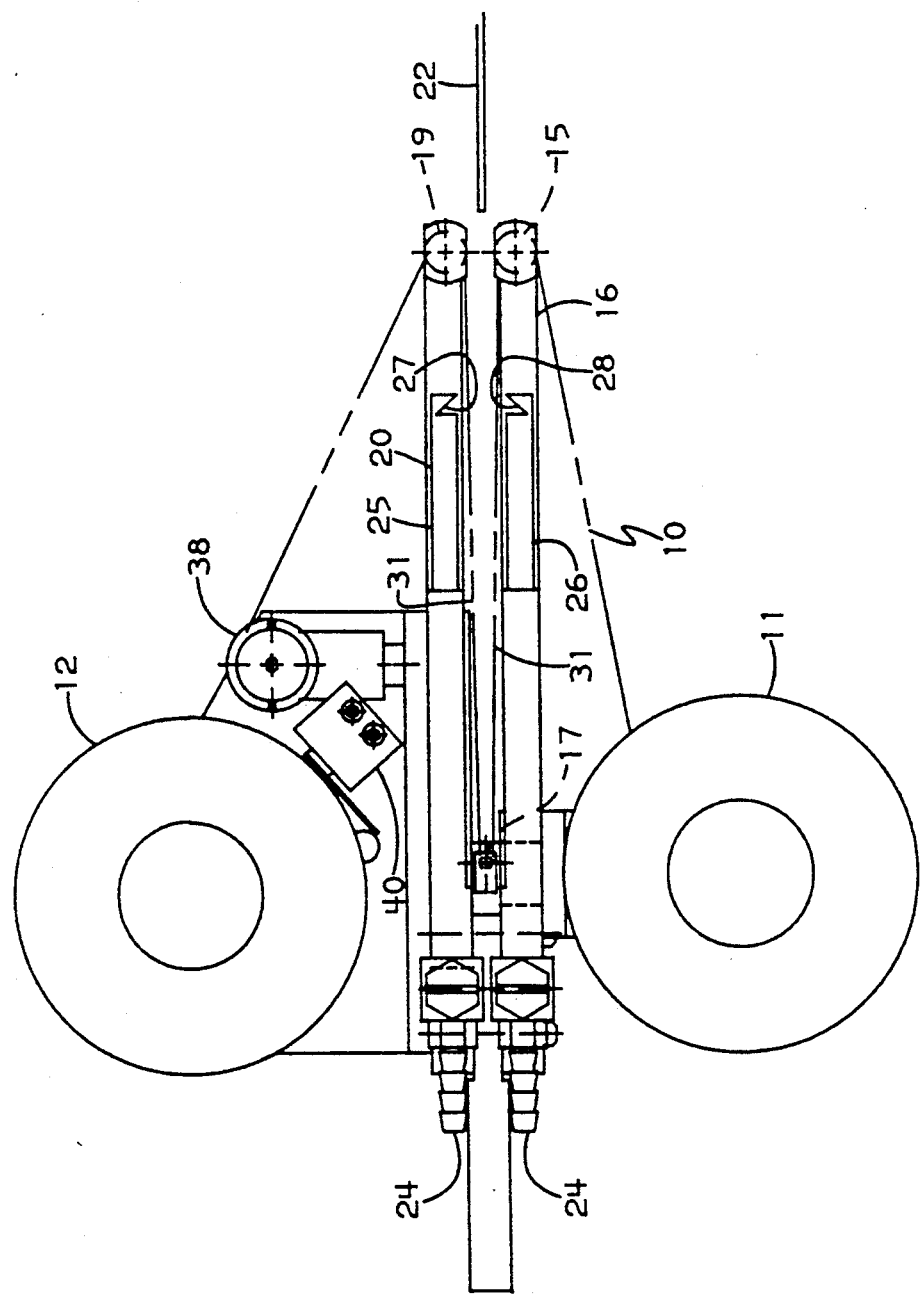
FIG. 2 is a side elevation of the burnishing fixture of FIG. 1.
Figure 3:
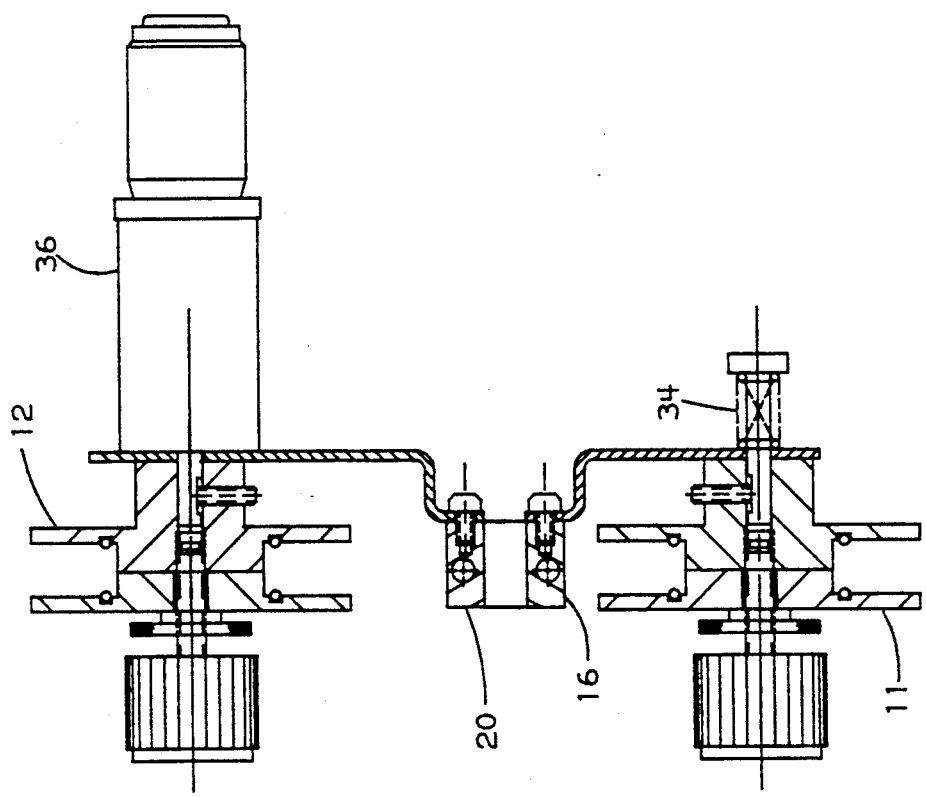
FIG. 3 is a vertical section of the burnishing fixture.

As shown in FIGS. 1 and 2 and the sectioned detail of FIG. 3, the burnishing apparatus includes a burnishing tape 10 that extends from a supply reel 11 to a take up reel 12. From the supply reel 11, the tape 10 extends over roller 15 on arm 16, a roller 17 and a roller 19 on arm 20 before being accumulated on take up reel 12. The burnishing tool provides the burnishing function at both sides of the disk 22 simultaneously using the same burnishing tape.

Figure 5:
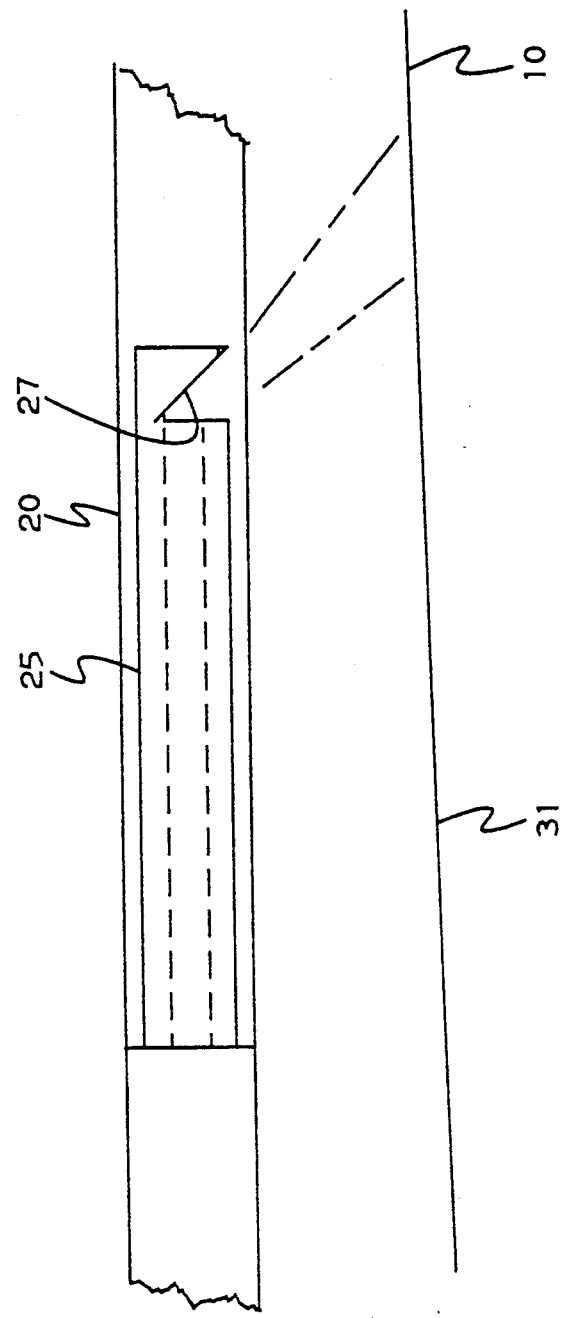
FIG. 5 is a detail view of the nozzle assembly.

Air supplied through inlet connectors 24 and respective passages in arms is delivered to the nozzle assemblies 25, 26. As seen in FIG. 5, each of the nozzles 25, 26 includes a tubular passageway and a deflector surface 27, 28 respectively at the terminal end. The deflector surfaces 27, 28 are inclined at about 45 degrees to the nozzle axes causing the air stream to be deflected and impinge upon the tape 10 to establish an elliptical pressure pattern 30 as the configuration of the contact area with the surface of disk 22 (as illustrated in FIG. 1).

The tape stretches 31, confront the major surfaces of disk 22. The generation of contact between tape 10 and the disk surface using air pressure applied to the tape between roller support members causes a more extensive tape surface to contact the disk surface with a lighter pressure that is not subject to instantaneous large contact pressure increases which might occur if the tape is forced toward the disk or workpiece by mechanical means such as a roller or by the limited area force application associated with an air knife.

FIG. 2 illustrates the burnish fixture as a rigid member wherein the rotating disk 22 is inserted between stretches of burnishing tape. Spring loaded reel 11 holds the unused portion of the abrasive tape 22 and reel 12 receives the used tape. Spring 34 on the supply reel 11 provides the system restraint and sets the tape tension, motor 36 connected to the drive take up reel 12 affords the force to move the tape 10 and roller and switch 38 afford the control means for precisely indexing the tape 10 an exact distance between burnish cycles. The tape 10 feeds off the supply reel 11; over rollers 15, 17,19; then over the top of roller and switch 38, and onto the motor driven take up reel. The roller and switch 38 provides a means of indexing an exact amount of tape per cycle by means of the slots cut into the roller to provide an open/closed circuit on the photo-electric switch. Switch 40 provides an automatic machine shut-off when the tape take up reel 12 is full.

As seen in FIG. 1, the burnishing device is mounted at about a 30 degree skew angle to the radial line 41. The burnishing device is carried by a voice coil motor (VCM) driven linear actuator that reciprocates along a radial line. The skewed burnishing tape 10, moving in a radial direction presents the elliptical tape contact pattern 30 in a position approximately perpendicular to the counterclockwise (CCW) rotational direction of the disk 22 to provide the maximum burnishing efficiency as the burnishing tool is reciprocated between the inner diameter (ID) and outer diameter (OD).

Figure 4:
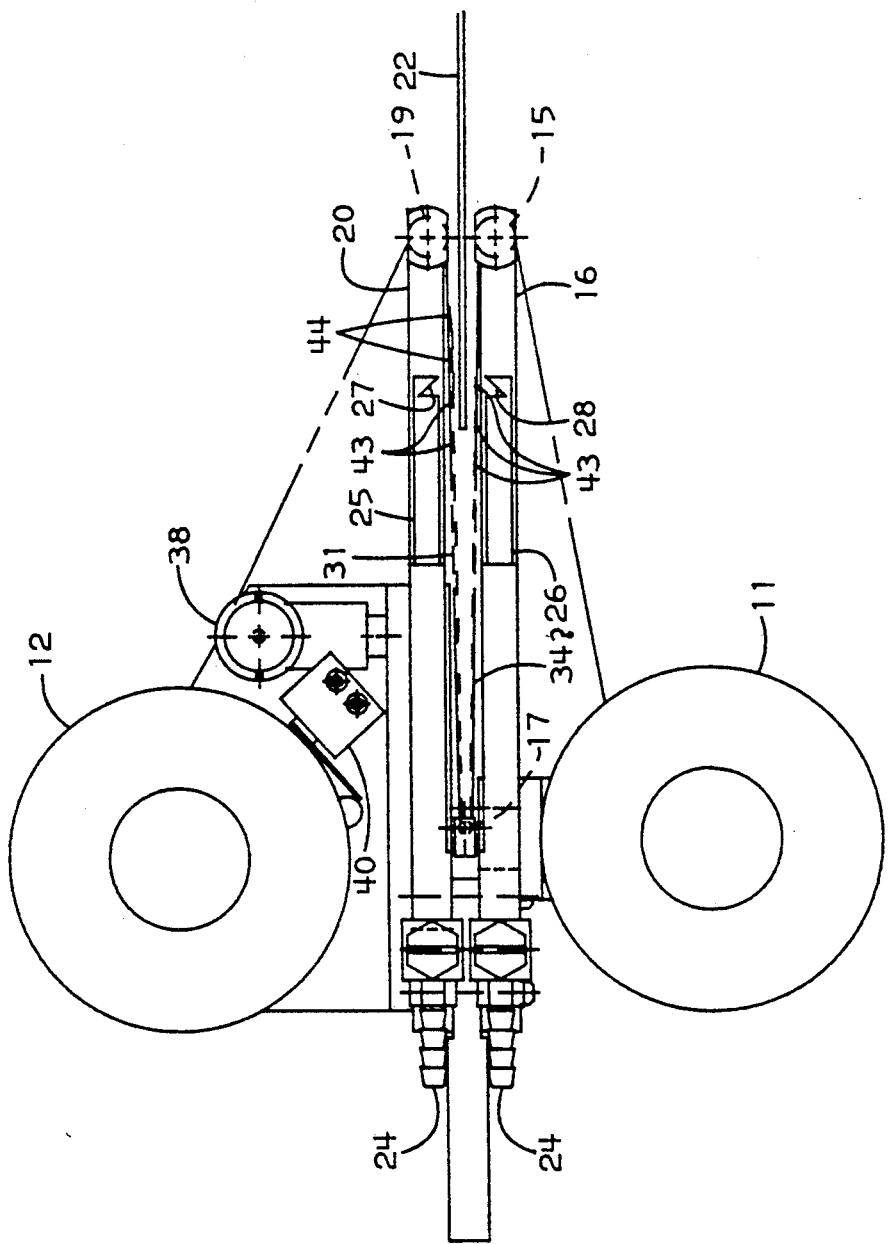
FIG. 4 is similar to FIG. 2 showing the interleaving of the burnishing tape contact patterns.

As seen in FIG. 4, the burnishing tape 10 is indexed between burnishing operations. The tape is indexed twice the distance or length of tape used for a single burnish operation. Thus following the first burnishing position the tape leaves with alternate portions used. By maintaining the length between the lower or initial burnishing location and the upper or second burnishing location a correct distance, the unused portions of the tape appear at the second burnishing location at the upper side of the disk. As illustrated in FIG. 4, the tape segments 43 are representative of the transverse elliptical patterns 30 used to burnish the lower surface of disk 22. By indexing tape 10 twice the length of segment 43 and having the tape out of phase at the upper burnish location, tape segments 44 present unused tape portions at the second burnish location while completely using the tape which is then accumulated on take up reel 12. The tape is thus fully utilized upon leaving the second burnishing location while presenting unused tape surfaces at each location.

Figure 6:
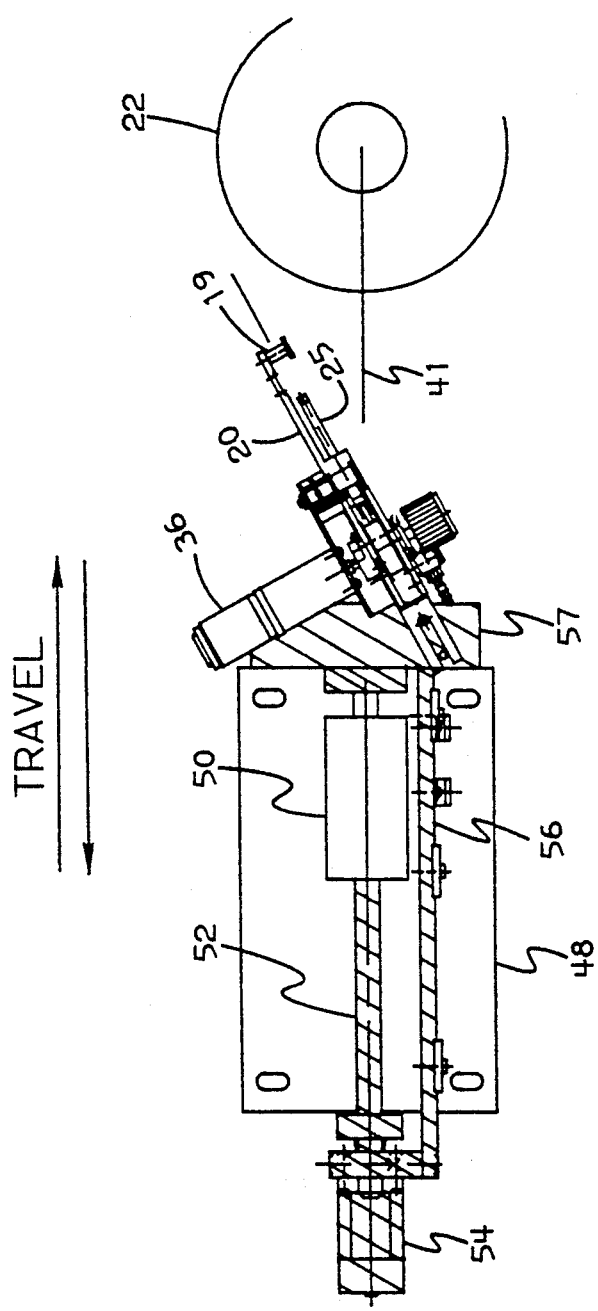
FIG. 6 is a plan view of the burnishing apparatus and the actuator upon which it is mounted to provide reciprocating movement with respect to a rotating disk.

FIG. 6 is a plan view illustrating the actuator device that carries and reciprocates the burnishing apparatus. A base plate 48 is rigidly secured to the same stationary mounting that supports the spindle about which the disk 22 is rotated. A thruster element 50 is secured to base 48 and threadably receives a lead screw 52. A motor 54 rotates the lead screw to reciprocate the frame 56 and mounting plate 57, to which the burnishing apparatus is rigidly attached, along the radius 41.

In operation, the disk as viewed in FIG. 1 is spun CCW at 2000 RPM and the burnish tool is advanced to receive the rotating disk between the tape stretches 31, 32. When the elliptical pressure patterns 30 overlie the disk OD, air delivery through the nozzles 25, 26 is initiated to start the burnishing operation. The burnish tool is then reciprocated to move the burnishing location from the OD to the ID and back to the OD. The air flow is then interrupted, the burnishing tool retracted from the rotating disk and the tape indexed in preparation for the next subsequent burnish operation.

While the invention has been particularly shown and described with reference to a preferred embodiment thereof, it will be understood by those skilled in the art that various changes in the form and details may be made therein without departing from the spirit and scope of the invention.

What is claimed is:

1. A burnishing apparatus for burnishing the surfaces of a rotating disk comprising a burnishing tape;
   means for positioning unsupported stretches of said burnishing tape intermediate locations of support, above and below said rotating disk;
   air delivery means for directing a deflected air stream toward each of said stretches of said burnishing tape to urge said tape into contact with the respected confronting surfaces of said rotating disk; and
   means for moving said burnishing apparatus relative to said rotating disk to advance the locations of tape contact across the surfaces of said disk.

2. The burnishing apparatus of claim 1 wherein the burnishing apparatus is moved radially with respect to the disk to access the disk surface and the stretches of tape are mounted at an acute angle to the direction in which said burnishing apparatus is moved.

3. The burnishing apparatus of claim 2 wherein the angle at which the tape stretches are mounted is approximately 30 degrees.

4. The burnishing apparatus of claim 1 wherein a predetermined length of said burnishing tape is used during each burnish operation and said tape is indexed to advance the tape intermediate burnish operations.

5. The burnishing apparatus of claim 4 wherein said tape is advanced approximately two times the distance used by the tape during a burnish operation and the length of tape between burnish locations is such as to provide an unused surface between two used surface portions at the second burnish location as the tape is repeatedly indexed in one direction.

6. The burnishing apparatus of claim 5 wherein said burnishing tape surface is substantially completely used following its being indexed past both burnishing locations.

7. The method of burnishing a rigid magnetic disk using an abrasive burnishing tape comprising
   rotating a disk to be burnished;
   positioning a stretch of abrasive burnishing tape, which extends between two locations of support, adjacent the surface of said rotating disk; and
   directing a deflected flow of air against said tape to urge said tape into contact with the surface of said disk, said flow of air defecting said tape intermediate said locations of support
   stretches of a single continuous tape are passed above and below said rotating disk and air flows are used to urge the respective stretches of tape into contact with the confronting disk surfaces.

8. The burnishing method of claim 7 further comprising indexing said tape between successive burnishing operations to present an unused tape surface at the burnishing location during each successive burnishing operation.

9. The burnishing method of claim 8 wherein said indexing step advances said tape twice the tape length used during a burnish operation and the distance between operating positions of said single continuous tape causes the unused tape portions to be presented at the second burnish location as the said tape is indexed.

* * * * *